(No Model.) 2 Sheets—Sheet 2.
F. F. HAWKES.
BICYCLE REST.
No. 602,134. Patented Apr. 12, 1898.
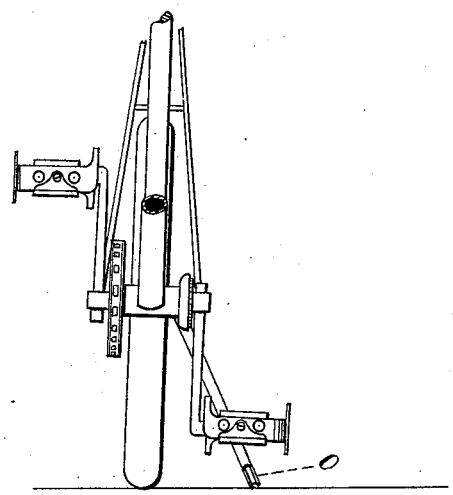
*Fig U,*

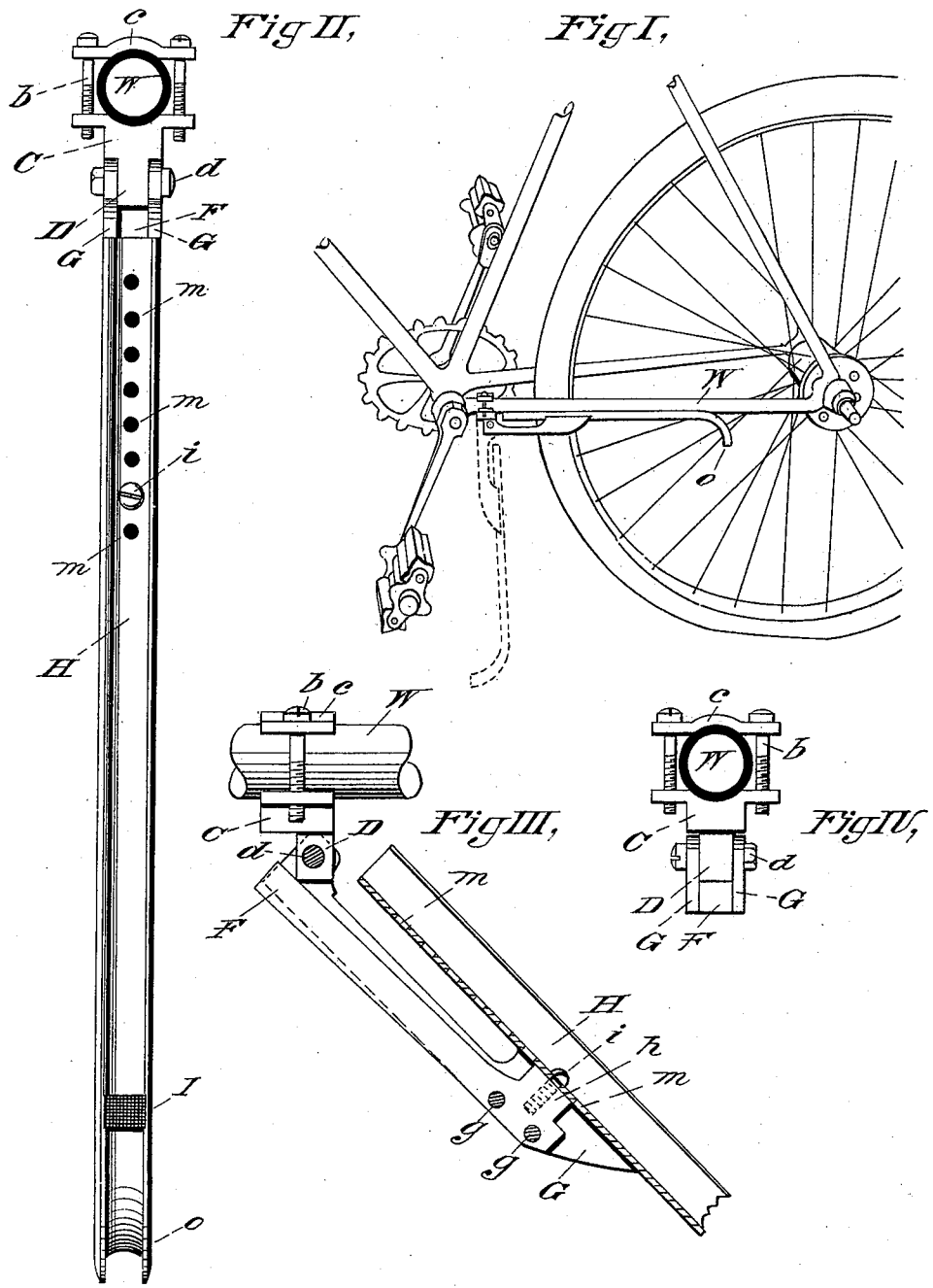

United States Patent Office.

FRANK F. HAWKES, OF WESTFIELD, MASSACHUSETTS, ASSIGNOR OF TWO-THIRDS TO EDWIN J. SMITH AND CLARENCE K. PRINCE, OF SAME PLACE.

BICYCLE-REST.

SPECIFICATION forming part of Letters Patent No. 602,134, dated April 12, 1898.

Application filed February 11, 1896. Serial No. 578,823. (No model.)

*To all whom it may concern:*

Be it known that I, FRANK F. HAWKES, a citizen of the United States, residing at Westfield, county of Hampden, and State of Massachusetts, have invented a new and useful Bicycle-Rest, of which the following is a specification.

My improvements relate to a spring folding rest for bicycles adapted to be operated both in opening and closing by the feet; and the invention consists in the combination and construction, as hereinafter described, and more particularly pointed out in the claims.

My invention is fully illustrated in the accompanying drawings, in which—

Figure I is a perspective view of so much of a bicycle as is necessary to illustrate the invention. Fig. II is an enlarged rear elevation of the device in an operative position. Fig. III is an enlarged side view of a part of the device and in partial section, and Fig. IV is an enlarged view of one end of the device when in a closed position. Fig. V is a broken elevation of a bicycle with rest attached, showing relation of the rest to the pedal.

Referring to the drawings, the attached end of the support is a clamp-piece adapted to be secured to the tubular framing of a bicycle and comprising two sections C c for inclosing the tube between them and screws b for drawing the sections together. The section C is provided with a dependent squared lug D, to which is hinged the swinging part of the rest. The swinging portion of the rest comprises two cheek-pieces G, inclosing a spring F, and a leg H, adjustably seated on the cheek-pieces and spring. The cheek-pieces and spring are riveted together at g, and the cheek-pieces are at their other ends hinged at d to the lug D, so that the free end of the inclosed spring F bears normally upon two sides of the lug to retain the swinging portion of the rest in either a closed or open position.

When the rest is in a closed position, coincident with the spring bearing upon the lower flat side of lug D, the leg H bears against the tube-framing and is held there by the spring, and when the rest is in an open position, at the same time that the spring bears against the flat side of lug D, the squared ends of the cheek-pieces are held by the spring squarely seated on the bottom section C of the clamp and at approximately right angles to the side tubing of the frame, to which the clamp is attached. When, however, as shown more particularly in Fig. III, the swinging section is swung to a position half-way between its open and closed position, the spring is on a dead-center on the corner of the lug D, so that a little impetus given to the leg H in either direction will cause the spring to become operative to snap the swinging part to a bearing, the device being in that respect analogous to a pocket-knife with the spring placed on the blade in place of being in the handle.

By making of the cheek-pieces an elongated shank to inclose the spring I am able to get the long spring essential to an easy double-working snap-joint.

Between the cheek-pieces where they are riveted is a lug h, conveniently formed integral with spring F, and in said lug is a screw-socket for a screw i.

The rear ends of cheek-pieces on each side of lug h are carried up to form, with the top of the lug, a seat for leg H, and a series of holes m through the under side of the leg enables it to be adjustably extended.

Combined with leg H is a spur o, setting off from its longer axis, so as to enable the foot to be used to rotate the rest from a closed position, and, as shown in Figs. I and II, the terminal end of the leg is curved outward, so as not only to form the spur, but to supply a foot having a better bearing upon the ground than a point or the mere end of a straight tube.

The leg H is formed of thin tubing at least semicircular in cross-section, so that the open or mouth part closes over the tubing against which it bears when in a closed position to thus fit closer to the machine-framing.

Within the leg H is secured a rubber cushion I, adapted to be compressible enough to permit the leg to lie close to the tubing, but in the first place taking up the shock of the impact of the leg impelled by the spring.

My device so constructed is clamped to the side tubing W on the opposite side of the frame to the sprocket-wheel and close in rear of the pedal-hub, and, as shown in Fig. I, has the leg H extend in a close position rearward along said tube W and closed to partially embrace it.

In Fig. I the rest is shown in side view in two positions—in solid lines closed and in dotted lines in operative position. When in a closed position, it is entirely out of the way of the pedal; but when extended, as seen in dotted lines, it is directly in the path of the pedal, so that by running the machine forward before mounting it or by righting the machine from its tipped position and placing a foot on the opposite pedal, either before or after mounting, the pedal on the rest side of the machine swings the leg to a point beyond where its spring is on a dead-center to permit the spring to complete the closing of it. So, also, when in a closed position a foot of the machine rider is removed from a pedal and pressed against the spur o to swing the leg out slightly beyond half-way, when the spring comes in action to complete the traverse of leg and the rider has only to dismount and slightly incline the machine to bring the rest to a bearing on the ground.

It will be seen that the operation of the rest is entirely independent of the hands.

Now, having described my invention, what I claim is—

1. The combination with the frame of a bicycle, of a clamp-piece embracing said frame near the pedal, and a leg having jointed connection to said clamp-piece, in position to be engaged by the pedal when swung away from contact with the frame, and means for retaining the leg folded against the frame, or in extended position, substantially as described..

2. The combination with the frame and pedal of a bicycle, of a supporting-rest connected to the frame and having a joint which may be folded in one direction only, means for holding the rest in folded or in extended position, said rest connected to the frame in position when extended to be struck by the moving pedal and folded back against the frame, and to be passed by the pedal when closed, all substantially as described.

3. The combination with the frame and pedal of a bicycle, of a rest connected to said frame, said rest having a joint which may be folded in one direction only, means for holding said rest folded against the frame or extended to act as a support, said rest attached in position to be struck and turned back from its extended to its folded position by the movement of the pedal, said rest also provided with a foot-piece by which it may be turned out by the foot of the rider without dismounting, whereby the support may be turned either out or in without dismounting, all substantially as described.

4. In a bicycle-support, the combination with a movable supporting-leg, of mechanism actuated by the movement of the drive-sprocket which is adapted to engage with the leg and raise the latter out of supporting position.

FRANK F. HAWKES.

Witnesses:
R. F. HYDE,
EDWIN J. SMITH.